US008559929B2

(12) United States Patent
Martin-Cocher et al.

(10) Patent No.: US 8,559,929 B2
(45) Date of Patent: Oct. 15, 2013

(54) RESOLVED MOBILE CODE CONTENT TRACKING

(75) Inventors: Gaelle Christine Martin-Cocher, Toronto (CA); Clara Margarida Severino, Toronto (CA)

(73) Assignee: BlackBerry Limited, Waterloo, Ontario ( * ) Notice: Subject to any disclaimer, the term of this patent is extended or adjusted under 35 U.S.C. 154(b) by 141 days.

(21) Appl. No.: 12/479,725

(22) Filed: Jun. 5, 2009

(65) Prior Publication Data

US 2010/0261450 A1  Oct. 14, 2010

(51) Int. Cl.
*H04M 3/42* (2006.01)
(52) U.S. Cl.
USPC .......... 455/414.1; 455/412.1; 455/556.1
(58) Field of Classification Search
USPC ............... 455/412.1, 414.1, 556.1
See application file for complete search history.

(56) References Cited

U.S. PATENT DOCUMENTS

| | | | |
|---|---|---|---|
| 6,827,273 B2 | 12/2004 | Wilz et al. | |
| 7,010,492 B1 | 3/2006 | Bassett et al. | |
| 7,364,067 B2 | 4/2008 | Steusloff et al. | |
| 2001/0049620 A1 | 12/2001 | Blasko | |
| 2002/0158127 A1 | 10/2002 | Hori et al. | |
| 2002/0161658 A1 | 10/2002 | Sussman | |
| 2005/0242189 A1* | 11/2005 | Rohs | 235/462.46 |
| 2005/0286463 A1* | 12/2005 | Matsumoto | 370/328 |
| 2006/0011728 A1 | 1/2006 | Frantz et al. | |
| 2006/0227671 A1 | 10/2006 | Tobita et al. | |
| 2007/0198357 A1 | 8/2007 | Ravazzolo | |
| 2007/0214155 A1 | 9/2007 | Chang et al. | |
| 2008/0182561 A1 | 7/2008 | Kim et al. | |
| 2008/0200153 A1 | 8/2008 | Fitzpatrick et al. | |
| 2009/0285484 A1 | 11/2009 | Mallinson et al. | |
| 2009/0307232 A1 | 12/2009 | Hall | |
| 2010/0094759 A1* | 4/2010 | Kanno et al. | 455/412.1 |
| 2010/0258630 A1 | 10/2010 | Shenfield et al. | |
| 2010/0261454 A1 | 10/2010 | Shenfield et al. | |

FOREIGN PATENT DOCUMENTS

| | | |
|---|---|---|
| DE | 102006016830 A1 | 10/2007 |
| EP | 0837416 A2 | 4/1998 |
| EP | 1860822 A1 | 11/2007 |
| FR | 2862467 | 5/2005 |
| FR | 2904881 A1 | 2/2008 |
| GB | 2446194 | 8/2008 |
| JP | 2008204009 A | 9/2009 |
| WO | WO-0227643 A1 | 4/2002 |
| WO | WO-2006112866 A2 | 10/2006 |
| WO | WO-2010118506 A1 | 10/2010 |
| WO | WO-2010118507 A1 | 10/2010 |
| WO | WO-2010118508 A1 | 10/2010 |

OTHER PUBLICATIONS

"International Application Serial No. PCT/CA2010/000527, International Search Report mailed", 17 pgs.

(Continued)

*Primary Examiner* — Manpreet Matharu
(74) *Attorney, Agent, or Firm* — Brinks Hofer Gilson & Lione

(57) ABSTRACT

Various embodiments herein provide at least one of systems, methods, software, and data structures for tracking usage of mobile codes on mobile electronic devices. Some embodiments include tracking mobile code usage locally on mobile electronic devices. Some embodiments include server mechanisms which facilitate mobile code tracking by mobile code tracking processes on mobile electronic devices. Other embodiments are also described.

16 Claims, 9 Drawing Sheets

(56) References Cited

OTHER PUBLICATIONS

"International Application Serial No. PCT/CA2010/000527, Written Opinion mailed Jul. 22, 2010", 6 pgs.

"European Application No. 09 163 993.0 Search report mailed Sep. 25, 2009", 9.

Kato, H, et al., "2D Barcode for Mobile Phone", (Nov. 15, 2005), 8.

"U.S. Appl. No. 12/479,656, Final Office Action mailed Oct. 18, 2010", 10 pgs.

"U.S. Appl. No. 12/479,662, Non Final Office Action mailed May 16, 2011", 11 pgs.

"International Application Serial No. PCT/US2009/38097, Preliminary Examination Report mailed Nov. 23, 2010", 8 pgs.

"International Application Serial No. PCT/CA2010/000527, International Preliminary Report on Patentability", 9 pgs.

Brenner, et al., "The Open Mobile Alliance", (Feb. 2008), 321-335.

* cited by examiner

RESOLVED MOBILE CODE CONTENT TRACKING

CROSS-REFERENCE TO RELATED APPLICATION

This non-provisional patent application claims the benefit of the filing date of U.S. Provisional Patent Application Ser. No. 61/169,307; filed Apr. 14, 2009; and entitled, "RESOLVED MOBILE CODE CONTENT TRACKING," the contents of which is incorporated by reference herein.

BACKGROUND

Mobile codes, also known as mobile barcodes, are an emerging technology in the mobile the space. Mobile electronic devices, such as mobile telephones including cameras may be used to acquire an image of a one or two dimensional mobile code which may then be processed (hereinafter referred to as resolution, resolving, and the like) to extract data embedded therein in a particular format. Mobile codes may be configured in different ways, for example as "direct" mobile codes and "indirect" mobile codes. In the case of direct mobile code resolution, the data that the mobile electronic device determines from the image may then be displayed or otherwise used by the mobile electronic device. In the case of indirect mobile code resolution, the mobile code symbology contains an identifier which is determined by the mobile electronic device and sent to a network resource for resolution. Responsive to receiving a communication with the identifier from the mobile electronic device the network resource then replies with content, an action to take on the content, or both. The data resolved (i.e., decoded) from a mobile code or retrieved from a Mobile Code Server is referred to as resolved content or dataset.

DETAILED DESCRIPTION

Figure 1:
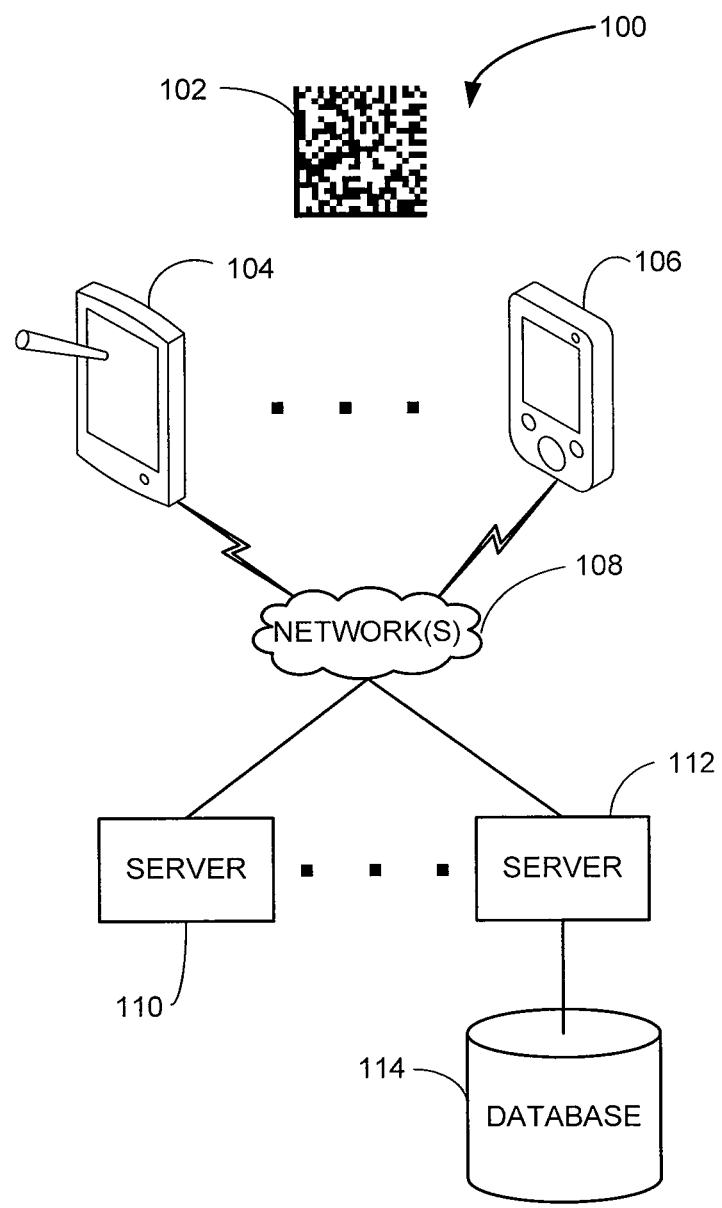
FIG. 1 is a system illustration according to an example embodiment.

Various embodiments herein include at least one of systems, methods, software, and data structures to allow for tracking of mobile code usage and actions and services associated therewith. Some such embodiments include mechanisms for tracking mobile code acquisition and subsequent usage of and actions performed with the content or service resolved from a mobile code. Such mechanisms typically provide tracking information to at least one entity involved in the transaction, namely the user's mobile operator and the content provider who supplied the content or service. Such embodiments effectively enable the mobile operator to utilize various charging models to maximize its revenue stream while supplying content providers with comprehensive usage tracking data.

Mobile codes are useful in many scenarios and more scenarios will emerge as mobile code use increases. One scenario is where the content of a resolved mobile code provides an image of a coupon for a store. In this scenario, the mobile code may be printed on a sign displayed next to a product that is the subject of the coupon and an image of the mobile code may be obtained through a camera of the mobile electronic device. In other embodiments, the mobile code image may be obtained through a store website, an image-based message, an email, or other modes.

Another scenario is with regard to an advertisement for a movie. A mobile code image may be obtained with regard to the movie and an image or other information relevant to the movie may be encoded as content within the mobile code. Yet another scenario is in the context of a boarding pass for an airline flight. A mobile code maybe printed on a boarding pass. An image of the mobile code may be acquired, such as through a camera of a mobile electronic device. The mobile code will be resolved which will provide flight information data as the content.

In each of these scenarios, there may be different entities involved, such as content providers, network operators over whose networks content may be retrieved, among other potential entities. However, limited abilities for tracking activities with regard to mobile codes deprives content providers of comprehensive data analysis possibilities (e.g., determining response to a given mobile barcode, or actions taken by a user in response to a given mobile barcode) which can be helpful in measuring promotional and awareness content effectiveness. Further, absent sufficient tracking capabilities, network service providers are denied the ability to track and charge for events and actions associated with the content and services accessed through resolved mobile codes.

The embodiments described herein are relevant to tracking mobile code usage in the scenarios described above and others. These embodiments are described in further detail below with reference to the drawings.

Mobile codes typically include data encoded in a barcode-type pictogram according to a barcoding symbology. Examples of barcoding symbologies include European Article Number/Universal Product Code (EAN/UPC) and variants such as EAN-13, EAN-8, UPC-A and UPC-B; QR and variants such as the Model 2 and Quick Response (QR) 2005 variants; Data Matrix and variants such as the Error Correcting Code (ECC) 20 variant; and Aztec. However, other symbologies including standardized and proprietary barcoding symbologies, and variants thereof, are equally relevant and within the scope of the various embodiments herein and the following claims.

Resolving a mobile code from the pictogram form results in a dataset that is typically encoded in a data format parsable or otherwise usable by a target application capable of consuming the resolved mobile code dataset. In an embodiment, a dataset is the collection of data that is encoded in the mobile code. The dataset conforms to the data format. In an embodiment, a data format is the schema in which mobile codes are encoded. The format of the dataset may be eXtensible Markup Language (XML), another markup language, or other format. Resolved mobile codes, in some embodiments, include data encoded therein, such as one or more of resolved content, a content usage tracking address and other tracking data, content expiration dates and data, and other data depending on the configuration of the particular embodiment.

In some embodiments, in the indirect mode case, the dataset may be partially available from the decoding of the pictogram and may be complemented by data returned by the code resolution server.

FIG. 1 is a system 100 illustration according to an example embodiment. The system 100 includes mobile electronic devices 104, 106 that communicate over at least one network 108. The system 100 also includes at least one server 110, 112 that communicates over the at least one network 108.

The mobile electronic devices 104, 106 may include one or more network interface devices that are operable to communicate over the at least one network 108. The mobile electronic devices may include, but are not limited to, mobile telephones, portable computers, personal digital assistants, and other devices that may be conveniently carried by a user and provide network communications, such as over a wireless connection. Mobile telephones include wireless communication devices that have generally been referred to as cell phones. Mobile telephones may include a wide range of communication devices from portable phones with limited functionality beyond voice communication to portable phones capable of providing the functionality of a personal computer. Connections between the mobile electronic devices 104, 106 and the at least one network 108 may include one or more wired or wireless connection possibilities. Examples of wireless connections may include connections to mobile radio networks operating at one or more frequencies according to one or more protocols of such networks (e.g., CDMA, GSM, etc.). The wireless connections may also, or alternatively, include wireless computing network connections, such as connections to Institute of Electrical Engineers (IEEE) 802.11-type IEEE 802.11 type networks (e.g., WiFi, WiMAX, WLAN, etc.). The connections may also include shorter range wireless connections to other devices that provide access to the at least one network 108. An example of such a shorter range wireless connection is a Bluetooth wireless connection to another computing device, such as a personal computer, that is connected to the at least one network 108. A further example of such a shorter range wireless connection is a Near Field Communication (NFC) wireless, contactless connection between mobile electronic devices 104, 106, connected to the at least one network 108. Wired connections may include a wired Ethernet connection between a mobile electronic device 104, 106 and the at least one network 108. Other connections may include a wired connection, such as a Universal Serial Bus (USB) wired connection to a USB port of a computing device in communication with the at least one network 108.

The at least one network 108 may include any number of network types, such as one or more of mobile telephone networks, wireless computer networks, and wired computer networks. The at least one network may be interconnected with one or more of the Internet, Local Area Networks (LAN), proprietary networks including content limited to access only by subscribers of particular services, and other networks.

Although two servers 110, 112 are illustrated, there may instead be one server, or more than two servers. The servers 110, 112 may provide one or more of content, services, indirect mobile code resolution (e.g., as a code resolution server), downloadable software, and the like. One or more of the servers may also provide mobile code usage tracking capabilities. The servers are accessible by the mobile electronic devices 104, 106 over the at least one network 108. Content provided by the servers 110, 112 may be stored on the respective server, in another location, such as in a database 114, accessible by a server 114, or elsewhere as may be retrieved by the servers 110, 112. Content provided by the servers 110, 112 may also be derived content that may be calculated, assembled, or otherwise determined by the servers 110, 112, such as in response to a query or other request received from a mobile electronic device 104, 106.

The system 100 is typically operable by a mobile electronic device 104, 106 receiving a mobile code image, such as mobile code image 102. As noted above, the mobile code image 102 may be received in several ways, such as from a camera or via a web page, email, a picture-based multi-media service (MMS) message, or other electronic modes depending on the capabilities of the mobile electronic device 104, 106. The mobile code image 102 is received by an application executing on the mobile electronic device 104, 106 and resolved to obtain the data encoded therein. The data is then parsed or otherwise processed by the application to obtain the resolved content and additional elements or metadata such as a tracking address specifying a location to which to report action data with regard to a mobile code or resolved content therefrom. The mobile code dataset may include direct resolved content, an identifier of additional content relevant to the direct resolved content, a code identifier referencing data to be obtained from a remote network location but needs to be resolved by a remote system to identify the resolved content, and data that may be used for tracking usage of and actions performed with regard to the mobile code dataset. The above-mentioned code identifier is sometimes referred to as an indirect code identifier (ICI). In some embodiments, if direct resolved content is included in a mobile code, an ICI is not. Conversely, in other embodiments, if an ICI is included in mobile code dataset, direct content is not. A local tracking system on the mobile electronic device 104, 106 typically tracks and records data representative of mobile code usage and may report the data to a mobile code tracking system over the network 108 as actions are performed, on a periodic basis, or in response to a request.

Figure 2:
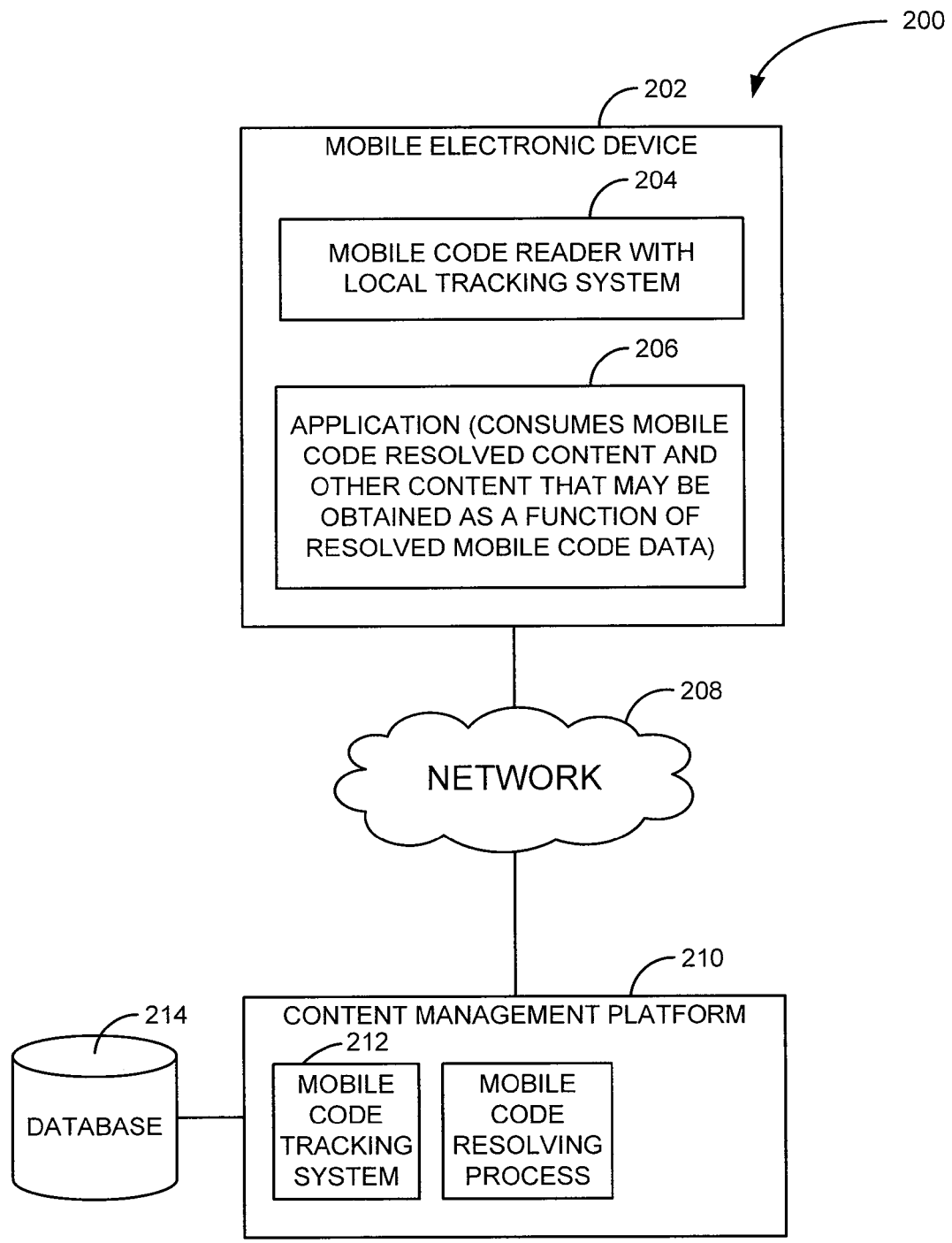
FIG. 2 is a block diagram of a system 200 according to an example embodiment.

FIG. 2 is a block diagram of a system 200 according to an example embodiment. FIG. 2 is an example of a tracking mechanism 200 used in direct mode resolution in a mixed-mode system, that is, a system that is capable of resolving both direct and indirect mobile codes. FIG. 2 includes a mobile electronic device 202 that communicates over a network 208 with a content management platform 210. The mobile electronic device includes a mobile code reader 204 with a local tracking system for tracking activities performed with regard to mobile codes. The mobile code reader 204 is operable to resolve data from mobile codes while the local tracking system tracks actions performed with regard to data resolved from mobile codes. Such actions will be referred to as mobile code actions. Mobile code actions may include functions or processes invoking one or more applications 206 that consume mobile code resolved content and other content that may be obtained as a function of resolved mobile code dataset. In one embodiment, the mobile code reader 204 is further operable to provide data representative of tracked mobile code actions over the network 208 to a mobile code tracking system 212 that executes on the content management platform 210. Alternatively, a mobile code tracking system 212 may belong to the content management platform but may be represented as a component outside the content management platform 210.

In one embodiment, the mobile code reader 204, after resolving data from a direct mobile code, retrieves the tracking information contained in the dataset and performs mobile code actions related to resolved content included therein. Such mobile code actions may include actions such as storing resolved mobile code dataset, displaying the resolved content or invoking an application to provide a rendering of the resolved content, such as a web browser, image viewing application, audio playback application, document viewing application, or other application depending on the content resolved from the mobile code. The tracking information retrieved from the dataset and used by the mobile code reader 204 may include one or more data items such as an indicator to perform tracking or not, a tracking address to which tracking data with regard to one or both of the mobile code and resolved content is to be sent, a content identifier field that identifies the resolved content when reported to the mobile code tracking system 212, and an identifier of a method to use to generate a tracking identifier. For example, a method identifier may identify a hashing method known to the mobile code reader 204 that can be applied to some or all of the resolved mobile code dataset to generate a value to report to the mobile code tracking system 212 as an identifier of the mobile code or resolved content therein. Alternatively, the tracking address may already contain one of a content identifier, a reference to the content, and a hash of the content as part of the address resolved from the mobile code. However, the tracking information may also or alternatively include other data depending on the configuration of the particular embodiment.

In some embodiments, the mobile code reader 204 may parse a tracking indicator and when the tracking indicator indicates that tracking needs to be performed, the mobile code reader 204 will notify the tracking system 212 of actions that have been performed. In that scenario the address of the mobile code tracking system 212 may have been provided to the mobile code reader for instance at a provisioning step (or initialization).

In some embodiments, for instance in the direct mode, the local tracking system will perform the tracking based on the presence of the tracking indicator and sends the metric report to the content URL that is available in the resolved content.

In some embodiments, the mobile code reader 204 may use a tracking address retrieved from a mobile code dataset to notify the mobile code tracking system 212 of mobile code actions that have been performed on or with regard to the content associated with a content identifier. The tracking system, as illustrated in FIG. 2, is composed of two components: a local component, which is illustrated as a part of the mobile code reader 204, and a remote server, illustrated as the mobile code tracking system 212 on the content management platform 210. The local tracking system included in the mobile code reader 204 may be a part of the mobile code reader application 204, part of another application, a stand-alone application that may be invoked by the mobile code reader 204, a process within an operating system of the mobile electronic device 202, or other process or application included within or accessible by the mobile electronic device 202. In one embodiment the local tracking system is an OMA MobAd Ad Engine. The tracking system included in the content management platform 212 may be a part of the content management platform 210 or a stand-alone component that may be invoked by the content management platform 210.

In some embodiments, the local tracking system on the mobile electronic device may not only track mobile code actions with regard to resolved content and action performed, but it may also augment such tracking data with other data. Such other data, depending on data available within the mobile electronic device, may include data such as a date/time when the mobile code/resolved content action is performed and location data such as may be available from a global positioning system (GPS) device that may be present in the mobile electronic device or network 208 connectivity data available from a radio device in the mobile electronic device 202. The other data may also include additional data items as may be set in a user profile or preference. However, the local tracking system may be limited by a user or service provider policy from providing certain elements of tracking data.

The local tracking system may transmit tracking data to the mobile code tracking system upon occurrence of a mobile code action. However, the local tracking system may also aggregate the tracking data over time and transmit the tracking data on a periodic basis. The tracking data for mobile code actions may be aggregated by tracking addresses and mobile code actions. For example, for tracking address X mobile code action Y was performed five times. This aggregation may be reported daily, monthly, or on another periodic basis as may be specified in a mobile code, a user preference, a network provider configuration, a mobile code tracking system preference communicated to the local tracking system of the mobile electronic device, or as may be otherwise set or determined.

The mobile code tracking system 212 may receive tracking information from multiple mobile electronic devices 202. The tracking information may be stored in a database 214, other storage location, or may be forwarded to a content provider. For example, where a mobile code is provided by a content provider other than an entity operating the content management platform 210, the mobile code tracking system 212 may forward the tracking information to the content provider. The tracking information may instead be retrieved by such content providers from the mobile code tracking system 212. The forwarding and retrieving may be performed automatically on a scheduled or ad hoc periodic basis. Thus, the content management platform 210 may be operated by a content provider or by a service provider that provides mobile code tracking services for content providers. Such service providers may be network operators, but may also be other entities that are able to communicate over network operator networks, the Internet, or other network over which data may be exchanged between the content management platform 210 and mobile electronic devices 202.

Figure 3A:
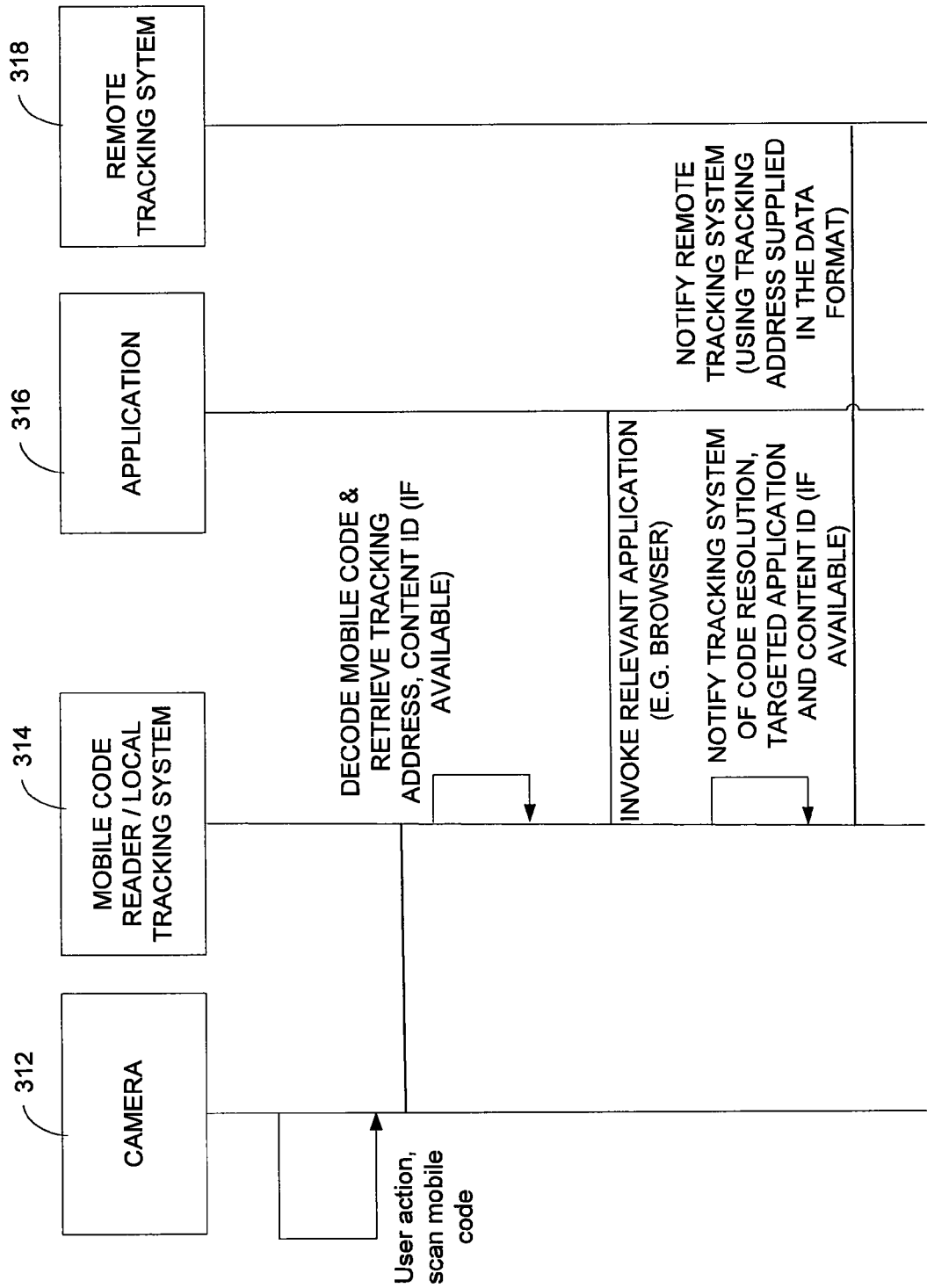
FIG. 3A is a data flow illustration of mobile code tracking according to an example direct mode mobile code resolution embodiment.

FIG. 3A is a data flow illustration of mobile code tracking according to an example direct mode mobile code resolution embodiment. This example embodiment includes a camera device 312 of a mobile electronic device that is responsive to user input and scans a mobile code. The scanned mobile code is then forwarded from the camera 312 to a mobile code reader 314, which is local to the mobile electronic device. The mobile code reader 314 may also include local tracking system functionality to track actions performed with regard to the mobile code. The mobile code reader 314 is operable to decode the mobile code and retrieve data from the mobile code which may include some or all of resolved content, a tracking address, a content identifier, and the like. The mobile code reader 314 may then invoke a relevant application 316 for presenting resolved content to a user, such as a web browser, or to consume or otherwise act on or relative to a resolved mobile code, such as a configuration application 316 that consumes configuration settings included in the resolved mobile code. The local tracking system of the mobile electronic device tracks one or more action performed on the mobile electronic device with regard to one or both of the mobile code and data decoded from the mobile code. In instances where the mobile code dataset includes a tracking address, a content identifier, or other data that may be relevant for tracking purposes, the local tracking system may send data representative of the tracked actions to a remote tracking system 318. In some embodiments, the remote tracking system 318 is known to the local tracking system by the tracking address, a configuration setting, or other data.

In some embodiments, tracking data may be sent to a tracking mechanism (not shown), other than the remote tracking system 318, specified by the mobile code reader 314 provider, typically a network operator. The mobile code provider/network operator is referred as the service provider. The location of the service provider tracking mechanism may be pre-provisioned on the mobile code reader 314. The local tracking system may send the tracking address included in the dataset to the service provider's tracking mechanism in which case the service provider is expected to report usage tracking data to the remote tracking system 318. Alternatively, the local tracking mechanism may be capable of appending the tracking address to the pre-provisioned service provider tracking address in a predefined manner to construct a "combined" URL (i.e., a URL redirect from a service provider server to the remote tracking system 318 at a content provider server).

Figure 3B:
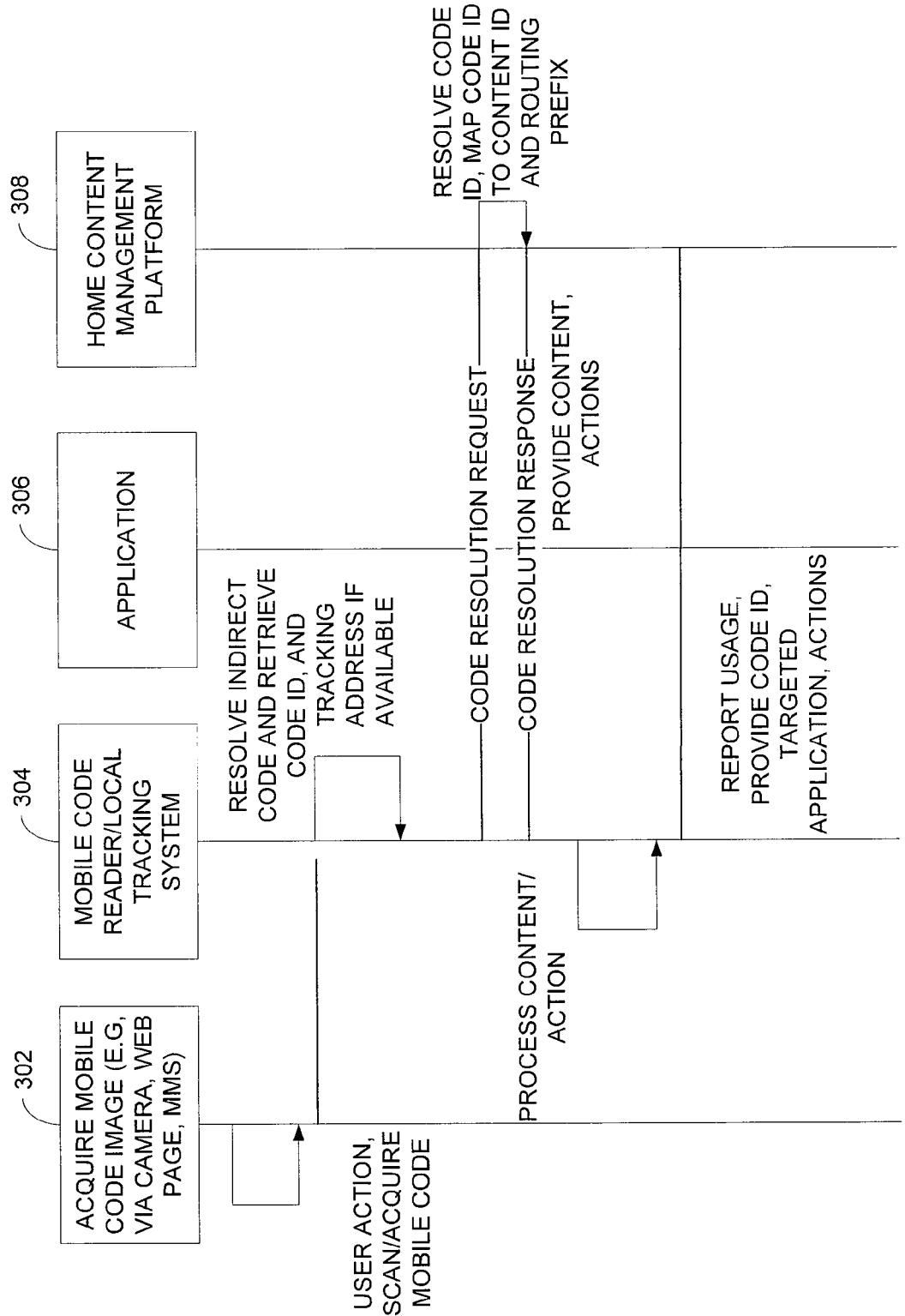
FIG. 3B is a data flow illustration of mobile code tracking according to an example indirect mode mobile code resolution embodiment.

FIG. 3B is a data flow illustration of mobile code tracking according to an example indirect mode mobile code resolution embodiment. As shown in FIG. 3B, once a mobile code is acquired 302 by a mobile electronic device, such as through a camera of the mobile electronic device or from a web page or multimedia message service (MMS) message including an image of a mobile code, the mobile code is resolved to obtain the resolved content. The resolved content is typically formatted in a parsable or other format that may be processed, such as XML, or another markup language. The mobile code reader 304, such as the mobile code reader 204 of FIG. 2, processes the mobile data to identify data elements therein. The mobile code dataset may include a code identifier, sometimes referred to as an indirect code identifier (ICI), that references data to be obtained from a remote network location. The mobile code dataset may also include data for tracking mobile code actions, such as a tracking identifier, a tracking address that identifies a network location to which tracking data regarding mobile code, ICI or resolved content related actions is to be reported. The tracking address may identify a home content management platform 308 that includes a mobile code tracking system or another mobile code tracking system.

In such instances where the mobile code dataset includes an ICI, the mobile code reader 304 may submit the ICI to a home content management platform 308 over a network in a mobile code resolution request. The home content management platform 308 will resolve the ICI, either locally or by forwarding the ICI to another network entity, and return appropriate information, which may include resolved content, a content identifier, and other data as needed such as a tracking identifier or tracking address. When resolving the ICI, the home content management platform 308 may generate an association between the ICI and the resolved content ID and/or the server ID from where the resolved content was retrieved. This association may be stored by the home content management platform 308 and an identifier of this association may be generated. Thus, when mobile code tracking information is received from the local tracking system, which may be part of the mobile code reader 304, of a mobile electronic device with an identifier (request identifier, content identifier, ICI), the tracking system belonging to the home content management platform can associate the tracking information to the specific mobile code or resolved content. Further, in the case where the mobile code ICI is resolved at a remote content management platform, the remote content management may map the code identifier received in the resolution request to a content identifier. In further embodiments, mapping may occur between one or more of a code identification, a content identification, and a routing prefix. In response to the resolution request from the home content management platform, the remote content management platform includes at least the content and may include one or more of actions to be performed on the resolved content, the routing prefix, content identification, a tracking identifier and tracking address.

The information returned by the home content management platform 308 will be used by the local tracking system of a mobile electronic device to track user actions performed with regard to the resolved content, such as viewing the content in an application 306. The tracking on the mobile electronic device in indirect mobile code resolution embodiments may be the same as discussed above with regard to direct mode mobile code resolution. The reporting of tracking information by the local tracking system of the mobile electronic device will be performed in accordance with data included in the mobile code dataset decoded from the pictogram or received from the home content management platform 308, such as with the identifier generated by the home content management platform 308 that is associated with the mobile code resolution request. This dataset may contain instructions for the local tracking system to submit the tracking information to the home content management platform 308, directly to a content provider bypassing the mobile code tracking system belonging to the home content management platform 308, or to another entity.

The reporting of tracking information may be performed upon an occurrence of a mobile code or resolved content action or tracking information may be stored and aggregated over time and reported on a periodic basis as discussed above. When reporting mobile code or resolved content action information, data representative of the respective mobile code or resolved content actions may be submitted by the target application 306 using an application programming interface of the local tracking system to one or more targets identified as the location(s) to which the action tracking information is to be submitted. The targets to which the local tracking system submits the action tracking information may be identified by the tracking address resolved from the mobile code or received from the home content management platform 308. In other embodiments, the data representative of the mobile code actions may be formatted by the local tracking system in a format, such as XML, and transmitted to one or more targets. In other embodiments, the tracking information may be retrieved from mobile electronic devices by mobile code tracking system, by the home content management platform 308, or other system such as a system of a content provider. The tracking information sent to or retrieved by the home content management platform 308, or other system, may include the identifier generated by the home content management platform 308 that is associated with the mobile code resolution request.

Figure 4:
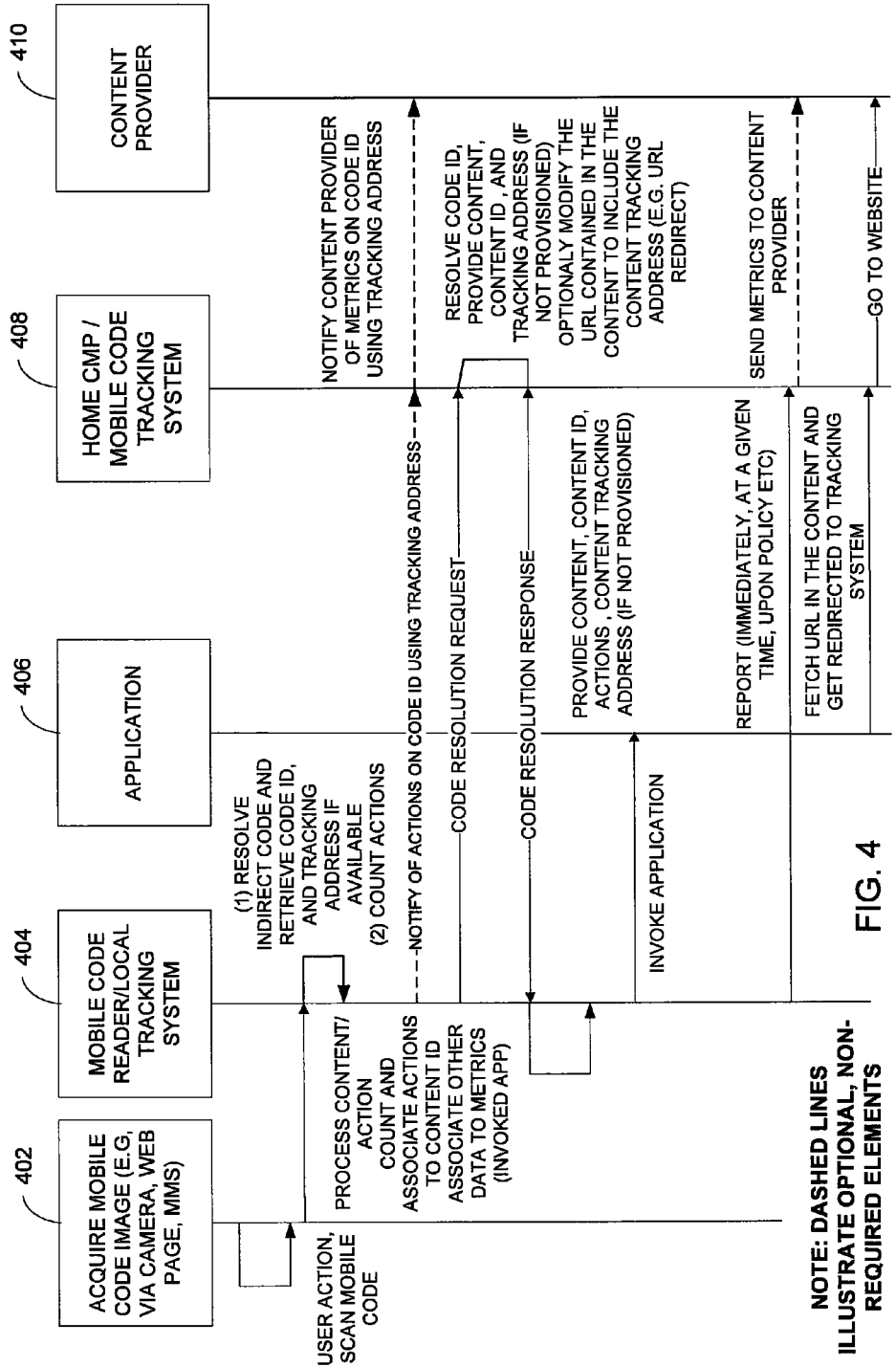
FIG. 4 is a data flow illustration of mobile code tracking according to an example indirect mode mobile code resolution embodiment.

FIG. 4 is a data flow illustration of mobile code tracking according to an example indirect mode mobile code resolution embodiment. This illustration is consistent with the illustration of FIG. 3B, but further provides details as to interactions between a content provider 410 and a Home Content Management Platform/mobile code tracking system (Home CMP/mobile code tracking system) 408, such as may be provided by a service provider or a network operator. Note that the mobile code tracking system may be a component of a home content management platform, an add-on module-type application that can augment operation of the home content management platform, a standalone application or server, or other process. In the illustrated example embodiment, a local tracking system of a mobile electronic device, which may be part of a mobile code reader 404 or other process on a mobile electronic device, is responsible for forwarding information representative of mobile code/resolved content usage to the Home CMP/mobile code tracking system 408 belonging to the home content management platform identified in the mobile code dataset or another address provided in response to an ICI resolution request. The tracking information is representative of mobile code action usage. In one embodiment the tracking information may contain a mobile code identifier, actions performed, extra data and tracking address to the targeted tracking system (home tracking system, remote tracking system, content provider tracking system). Such mobile code/resolved content actions may be performed by one or more of the mobile code reader 404, an application 406 invoked by the mobile code reader 404, or other applications or processes that utilize mobile code data. The Home CMP/mobile code tracking system 408 may be generally accountable for providing usage statistics to the appropriate content provider 410 in embodiments where the Home CMP/mobile code tracking system 408 is not operated by the content provider 410 that provided the mobile code(s). The Home CMP/mobile code tracking system 408 when receiving the information representative of mobile code action usage may use the targeted tracking address to forward the information, or a subset thereof, and for calculating usage charges to be billed to the content provider 410.

Alternatively, in order to facilitate tracking based on application 406 or user access to content associated with a mobile code, the home CMP/mobile code tracking system 408 may alter the resolved content by changing URL(s) embedded in the content, such as a URL link to a coupon, to redirect the user through use of a URL redirect to route the request through the Home CMP/mobile code tracking system 408 before accessing the requested content or service 410. In other embodiments, the local tracking system 404 of a mobile electronic device may alter URLs or other links with regard to a mobile code/resolved content to be directed first through the Home CMP/mobile code tracking system 408 before being redirected to the requested content. The address for tracking the resolved content may be the same or different from the address for tracking the mobile code (i.e. before accessing the resolved content).

Figure 5:
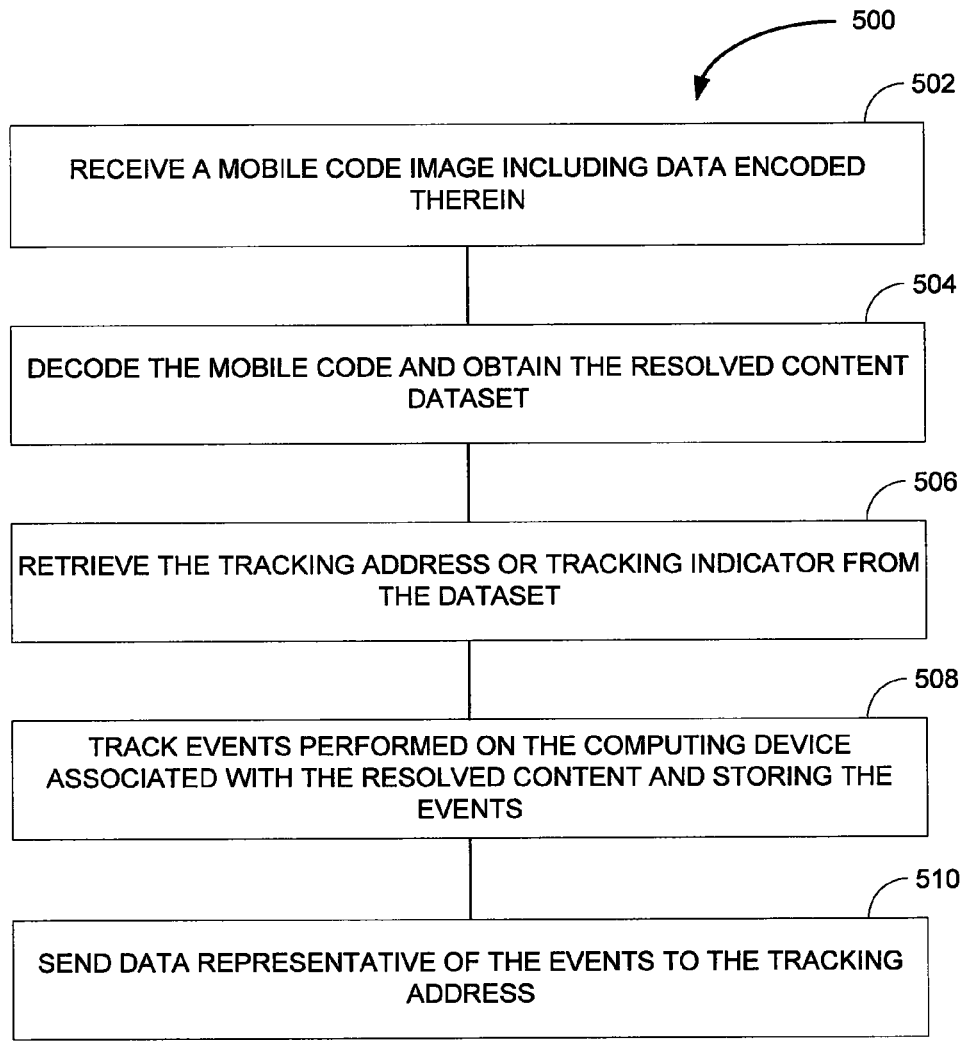
FIG. 5 is a block diagram of a method according to an example embodiment.

FIG. 5 is a block diagram of a method 500 according to an example embodiment. The method 500 is an example of a method that may be performed by a mobile electronic device. The example method 500 includes receiving 502 a mobile code including data encoded therein and decoding 504 the mobile code to further retrieve the resolved content dataset. The dataset maybe in a data format, such as XML. The method 500 further includes retrieving 506 a tracking address or tracking identifier from the mobile code dataset. In some embodiments, retrieving the resolved content may include an ICI that may be used to retrieve the content dataset and other data from a content provider via an ICI code resolution service. The method 500 also includes tracking 508 events performed with the resolved content and storing a representation of such events. Data representative of the stored events may then be sent 510 to a remote network location, such as may be identified by the tracking address or tracking identifier. In some embodiments, data representative of the stored events, the tracking address, and other data, depending on the configuration of the particular embodiment, may be sent to a remote network location, such as a home content management platform. The home content management platform may then forward the data representative of the stored events to the tracking address, store the data and aggregate the data with other tracking data, or perform other actions with the data. When aggregated, the data may later be forwarded in the aggregated form to the tracking address.

In some embodiments of the method 500, the mobile code dataset includes a content identifier that identifies the resolved content. When reporting usage regarding the mobile code or resolved content, the content identifier may be sent to the tracking address along with identifiers of actions. In some embodiments where a content identifier is not included in the mobile code dataset, a hash function may be applied to the mobile code or to the resolved content, or a portion thereof. A resulting hash value can then be used in place of a content identifier. In other embodiments, the hash value may already be included in the mobile code dataset and is used as the content identifier.

In some embodiments of the method 500, an action or event performed with regard to a mobile code or resolved content may include presenting the resolved content via a user interface device, such as a display, a speaker, or other output device of a mobile electronic device, depending on the type of the resolved content. Such actions or events, which are used interchangeably to refer to what is or may be performed with a mobile code or resolved content, may also include sending one or more of the mobile code, and resolved content to another computing device such as another mobile electronic device or a personal computer.

Tracking performed events that are associated with the mobile code, or resolved content may include storing one or more parameters of the associated event according to a tracking policy. The tracking policy may be local configuration settings, a policy received from a mobile code tracking system, a policy included in mobile code dataset, or other configuration settings that may be stored or received or defined by a user. These parameters specified in such policies may include a parameter that identifies an application accessing the resolved content, a date and time of when an event occurred, a location where the event occurred as may be determined based on data from a GPS device of a mobile electronic device, as input by a user, by identifying a radio tower the mobile electronic device is in communication with, or by other methods depending on the particular embodiment. Such policies may also specify when tracking information is to be uploaded to the tracking address or elsewhere.

Figure 6:
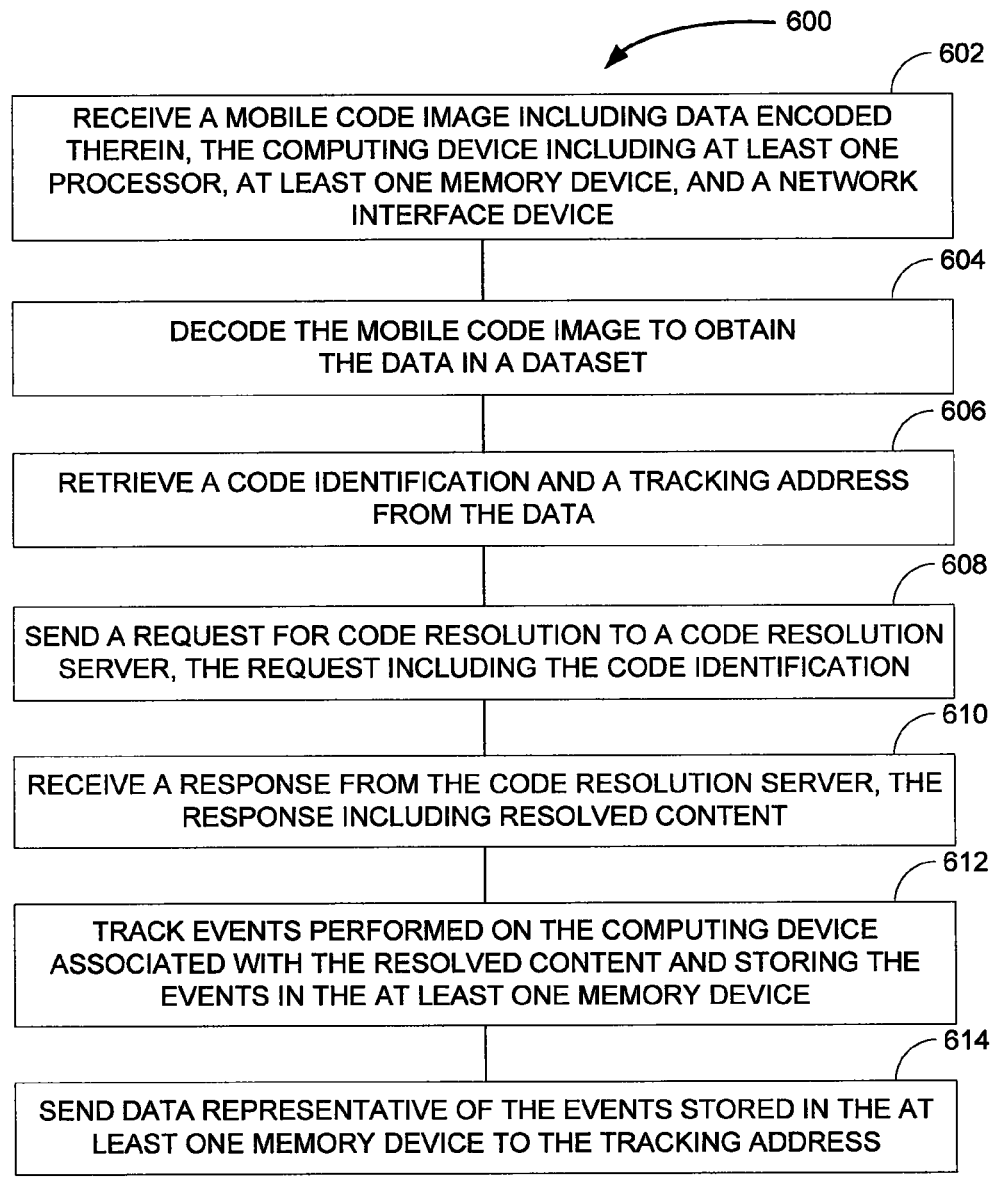
FIG. 6 is a block diagram of a method according to an example embodiment.

FIG. 6 is a block diagram of a method 600 according to an example embodiment. The method 600 is another example of a method that may be performed by a mobile electronic device. The example method 600 includes receiving 602 a mobile code image including data encoded therein and decoding 604 the mobile code image to obtain the mobile code dataset. The method 600 further includes retrieving 606 a code identification and/or a tracking address (e.g. if not provisioned or preconfigured) from the mobile code dataset and sending 608 a request for code resolution to a code resolution server with the code identification. In response, the method 600 includes receiving 610 resolved content and subsequently tracking 612 events performed in association with the resolved content. Representations of such events may be stored. These representations, or data derived there from, may then be sent 614 to the tracking address (either retrieved from the dataset, or pre-configured). In some embodiments of the method 600, the response received 610 from the code resolution server may include a content identification and a routing prefix for sending to the tracking address when reporting events. In this case, the local tracking system may send the tracking data along with a content identification to the home content management platform to facilitate the retrieval of the tracking address to which the tracking data is to be forwarded.

Figure 7:
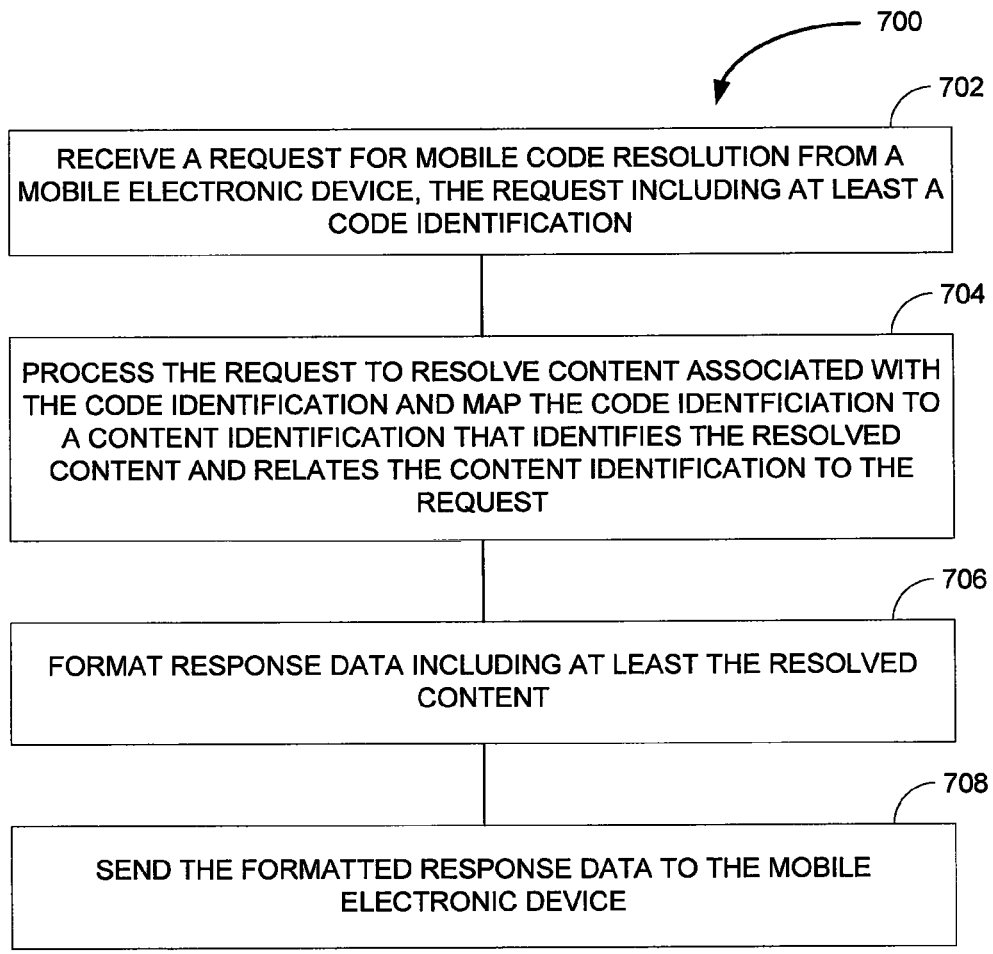
FIG. 7 is a block diagram of a method according to an example embodiment.

FIG. 7 is a block diagram of a method 700 according to an example embodiment. The method 700 is an example of a method that may be performed by a mobile code tracking system, such as on one or more server computing devices. The example method 700 includes receiving 702 a request for mobile code resolution from a mobile electronic device. The received 702 request may include a code identification. The method 700 further includes processing 704 the request to resolve content associated with the code identification and mapping the code identification to a content identification that identifies the resolved content and relates the content identification to the request. The method 700 further includes formatting 706 response data, the response data including at least the resolved content and then sending 708 the formatted 706 response data to the mobile electronic device. Alternatively, the formatted 706 response data may include at least the resolved content and the code identification to support asynchronous operations. In either case, the local tracking system may send the tracking data along with a code identification to the home content management platform to facilitate the retrieval of the tracking address to which the tracking data is to be forwarded.

Processing 704 the request may alternatively include mapping a content identification to a tracking address. In such embodiments, the content identification identifies the resolved content and the tracking address identifies the computing device performing the method 700. In this case, the local tracking system may send the tracking data along with the tracking address to the home content management platform to specify the tracking address to which the tracking data is to be forwarded.

In some embodiments, the formatted 706 response data includes instructions executable by a mobile electronic device to modify a tracking address on the mobile electronic device. For example, if a content item includes a URL, that URL may be modified to be directed to the computing device performing the method 700 which upon receipt of a request for the URL, will track receipt of the request and redirect the request to the intended location.

In some embodiments, the method 700 may further include notifying a content provider, such as a content provider that provided a mobile code, that a code resolution request was received. The method 700 may also include receiving tracking data from the mobile electronic device, the tracking data including actions performed on the resolved content by the mobile electronic device. This tracking data may then be sent to a content provider, such as in instances when the method 700 is performed by an entity other than the content provider.

The method 700 may be performed by a content management platform, such as content management platform 308 illustrated and described with regard to FIG. 3B. In some such embodiments, the content management platform, when processing 704 the request to resolve content associated with the code identification, the content management platform does not perform the mapping of the code identification or the content identification to one or more of a content identification that identifies the resolved content, the routing prefix that identifies the network entity capable of resolving the mobile code dataset, the tracking address of the remote tracking mechanism. Instead, the data subsequently received from a local tracking system of a mobile electronic device includes the usage tracking data specifying a content identifier and may also include a routing prefix. The routing prefix may be known to the local tracking system from the resolved mobile code, could be previously known such as from a configuration setting or as cached from another mobile code, or is otherwise obtained or known. The routing prefix may not be included in some embodiments however, such as when the tracking is also performed by the home content management platform. In some embodiments, the tracking address returned by the home content management platform may already contain a content identification and routing prefix referred or encoded as part of the tracking address.

Figure 8:
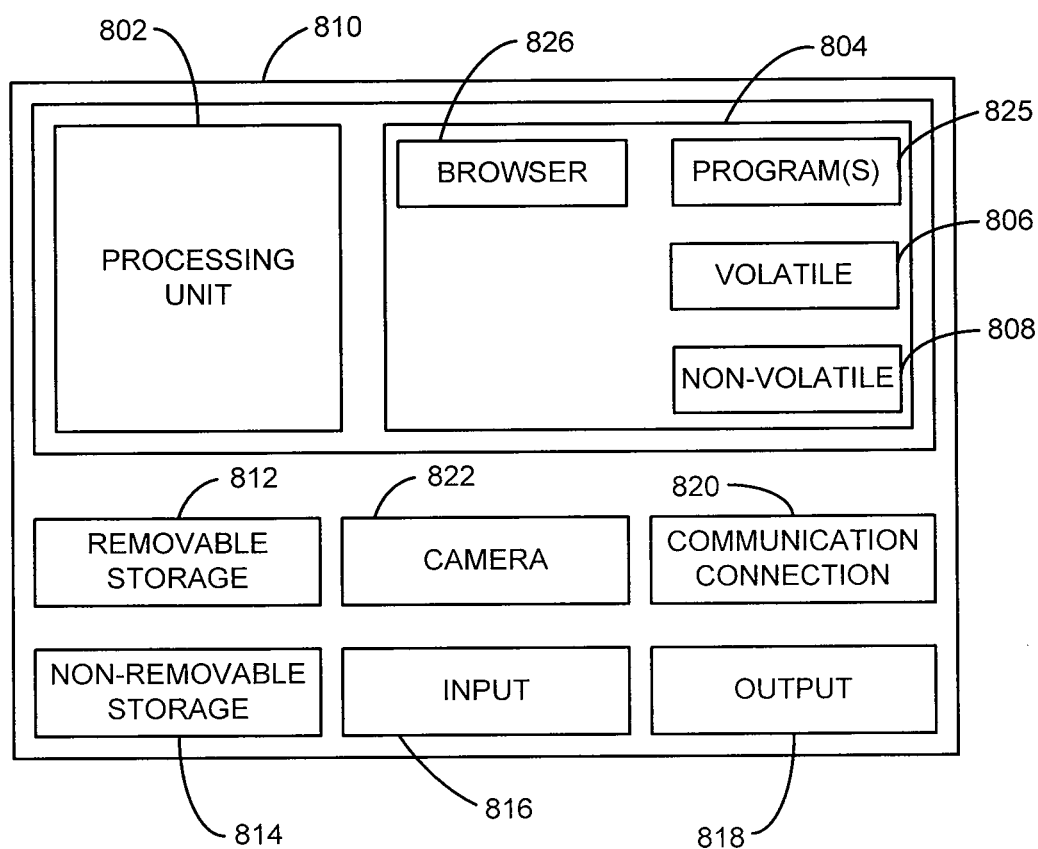
FIG. 8 is a block diagram of a computing device according to an example embodiment.

FIG. 8 is a block diagram of a computing device according to an example embodiment. In one embodiment, multiple such computer systems are utilized in a distributed network to implement multiple components in a transaction based environment. An object-oriented, service-oriented, or other architecture may be used to implement such functions and communicate between the multiple systems, devices, and components, such as in a networked computing environment described above with regard to the system 100 of FIG. 1.

One example computing device is in the form of a mobile electronic device 810. The mobile electronic device 810 is an example of the mobile electronic devices 104, 106 described above with regarding FIG. 1. The mobile electronic device 810 may include a processing unit 802, memory 804, removable storage 812, and non-removable storage 814. The processing unit 802 may include one or more processing units or may include one or more multiple-core processing units. Memory 804 may include volatile memory 806 and non-volatile memory 808. Mobile electronic device 810 may include a variety of device-readable media, such as volatile memory 806 and non-volatile memory 808, removable storage 812 and non-removable storage 814. The storage may include random access memory (RAM), read only memory (ROM), erasable programmable read-only memory (EPROM) & electrically erasable programmable read-only memory (EEPROM), flash memory or other memory technologies, or any other medium capable of storing machine-readable instructions and data that may be present in a mobile electronic device. Mobile electronic device 810 may include input 816, output 818, and a communication connection device 820. The mobile electronic device 810, in some embodiments, may also include a camera 822.

The mobile electronic device 810 typically operates in a networked environment using the communication connection device 820 to connect to one or more networks, such as network 108 described above with regard to FIG. 1. Through the communication connection device 820, the mobile electronic device 810 may connect to one or more remote computers. The remote computer may include a personal computer (PC), server (such as servers 110, 112, also described with regard to FIG. 1), router, network PC, a peer device or other common network node, or the like. The communication connection device 820 may connect to various network types that may include a wireless telephone network, a Local Area Network (LAN), a Wide Area Network (WAN), the Internet, a proprietary subscription-based network, or other networks. The mobile electronic device 810 also may include wireless telephone capabilities to provide voice telephone service via a wireless telephone network.

Machine-readable instructions stored on a machine-readable medium are executable by the processing unit 802 of the mobile electronic device 810. The memory 804, removable storage 812, and non-removable storage 814 are some examples of articles including a machine-readable medium. For example, a program 825 with instructions that may be executed by the processing unit 802 to cause the mobile electronic device 810 to perform one or more of the methods described herein may be stored on a machine-readable medium, such as the memory 804. Other programs 825 may also be stored on a machine-readable medium, such as a browser application 826 providing web browsing functionality of the mobile electronic device 810. Further, the programs 825 may include a mobile code reading application that may be operable to extract data from a mobile code image received from camera 822, from a remote server within an email, in an MMS message, a web page viewable within the browser application 826, or other source. In some embodiments, the mobile code reading application may be a service application to provide mobile code services, such as a service application included within an operating system that executes upon the mobile electronic device. In other embodiments, the mobile code reading application may be a component of another application operable to present data of and obtained based on data from a mobile code image. The programs 825 may also include a local mobile code tracking system as discussed above.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method for tracking the usage of resolved content, the method comprising:
   processing a mobile code to decode a dataset that was encoded in the mobile code;
   using the dataset to identify a tracking address and a tracking indicator, the tracking address being a network location to which tracking information is to be reported, and the tracking indicator being an indication of whether tracking will be performed;
   determining a tracking identifier based on the dataset, the tracking identifier identifying at least one of the mobile code or the content;
   tracking usage of the content or the mobile code based on the tracking indicator by using the tracking identifier and the tracking address; and
   sending tracking information for the usage of the content to a tracking server identified by one of the tracking address, the tracking identifier, or a device configuration parameter;
   wherein the tracking server is identified by a combined universal resource locator (URL), the combined URL constructed by appending the tracking address to a pre-provisioned service provider tracking address in a pre-defined manner.

2. The method of claim 1, wherein retrieving the dataset comprises resolving the mobile code in a direct mode wherein the resolving is performed on a mobile electronic device.

3. The method of claim 1, wherein retrieving the dataset comprises resolving the mobile code in an indirect mode wherein the dataset is received over a network.

4. The method of claim 1, wherein retrieving the dataset comprises retrieving one or more actions to be performed.

5. The method of claim 1, further comprising storing the tracking information for the usage of the content on a mobile electronic device.

6. A method comprising:
   receiving a request for mobile code resolution from a mobile electronic device;
   processing the mobile code to decode a dataset that was encoded in the mobile code;
   mapping the code identification to a content identification related to the request;
   sending the dataset corresponding to the resolved mobile code to the mobile electronic device, wherein the dataset comprises a content, a tracking identifier, a tracking address, and a tracking indicator, the tracking address being a network location to which tracking information is to be reported, and the tracking indicator indicating whether tracking will be performed;
   receiving tracking information representative of mobile code action usage comprising a mobile code identified, actions performed, and an address of a targeted tracking system; and
   sending the tracking information representative of mobile code action usage to at least one of a content provider of the content in the dataset, a remote tracking system associated with indirect mode resolution of the mobile code, a home content management platform, a remote content management platform, and a third party tracking system.

7. The method of claim 6, further comprising mapping between one or more of a code identification, content identification, and routing prefix.

8. A mobile electronic device comprising:
   a processor;
   a mobile code reading application, executed on the processor, to decode a mobile code and produce a dataset that was encoded in the mobile code;
   a retrieving module to retrieve the dataset comprising at least a content, a tracking address, and a tracking indicator and determine a tracking identifier based on the dataset, the tracking identifier identifying at least one of the mobile code or the content;
   a local tracking system to track data representative of the content usage on the mobile electronic device based on the tracking indicator and the tracking identifier; and
   a network interface device to send the data representative of the content usage to a combined universal resource location (URL), wherein the local tracking system is configured to append the tracking address to a pre-provisioned service provider tracking address in a pre-defined manner to construct the combined URL.

9. The mobile electronic device of claim 8, wherein the local tracking system is to track at least one of the display of the content on a user interface device, actions performed by a user with the content, and usage of the content by different applications of the mobile electronic device.

10. The mobile electronic device of claim 8, wherein the network interface is to send the data representative of the content usage to the tracking address after aggregating the data for a period of time and wherein the network interface is to send the aggregated data representative of the content usage to the tracking address periodically.

11. The mobile electronic device of claim 8, wherein the data representative of the content usage is augmented with other data specified in a user profile.

12. The mobile electronic device of claim 8, wherein the other data comprises one or more of a date when an action is performed, a time when an action is performed, and a location of where an action is performed.

13. The mobile electronic device of claim 8, wherein the tracking address comprises a universal resource locator.

14. The method of claim 1, wherein the tracking address comprises a universal resource locator.

15. A non-transitory computer-readable medium storing instructions on a processor that causes a mobile electronic device to perform a method comprising:
- processing a mobile code to decode a dataset that was encoded in the mobile code;
- using the dataset to identify a tracking address and a tracking indicator, the tracking address being a network location to which tracking information is to be reported, and the tracking indicator being an indication of whether tracking will be performed;
- determining a tracking identifier based on the dataset, the tracking identifier identifying at least one of the mobile code or the content;
- tracking usage of the content or the mobile code based on the tracking indicator by using the tracking identifier and the tracking address; and
- sending tracking information for the usage of the content to a tracking server identified by one of the tracking address, the tracking identifier, or a device configuration parameter;
- wherein the tracking server is identified by a combined universal resource locator (URL), the combined URL constructed by appending the tracking address to a pre-provisioned service provider tracking address in a pre-defined manner.

16. A non-transitory computer-readable medium storing instructions on a processor that causes a mobile electronic device to perform a method comprising:
- receiving a request for mobile code resolution from a mobile electronic device;
- processing the mobile code to decode a dataset that was encoded in the mobile code;
- mapping the code identification to a content identification related to the request;
- sending the dataset corresponding to the resolved mobile code to the mobile electronic device, wherein the dataset comprises a content, a tracking identifier, a tracking address, and a tracking indicator, the tracking address being a network location to which tracking information is to be reported, and the tracking indicator indicating whether tracking will be performed;
- receiving tracking information representative of mobile code action usage comprising a mobile code identified, actions performed, and an address of a targeted tracking system; and
- sending the tracking information representative of mobile code action usage to at least one of a content provider of the content in the dataset, a remote tracking system associated with indirect mode resolution of the mobile code, a home content management platform, a remote content management platform, and a third party tracking system.

* * * * *

UNITED STATES PATENT AND TRADEMARK OFFICE
CERTIFICATE OF CORRECTION

PATENT NO. : 8,559,929 B2  
APPLICATION NO. : 12/479725  
DATED : October 15, 2013  
INVENTOR(S) : Gaelle Christine Martin-Cocher et al.

Page 1 of 1

It is certified that error appears in the above-identified patent and that said Letters Patent is hereby corrected as shown below:

On the Title Page

Left column, insert a new item (60):

--Related U.S. Application Data

Provisional application No. 61/169,307, filed on April 14, 2009.--.

Right column, Item 56 line 8, under "FOREIGN PATENT DOCUMENTS", replace "WO WO-0227643 A1 4/2002"

with

--WO WO-2002027643 A1 04/04/2002--.

Signed and Sealed this

Seventeenth Day of December, 2013

Margaret A. Focarino
*Commissioner for Patents of the United States Patent and Trademark Office*